(12) United States Patent
Husemann et al.

(10) Patent No.: US 7,307,115 B2
(45) Date of Patent: Dec. 11, 2007

(54) ADHESIVE MATERIAL BASED ON BLOCK COPOLYMERS HAVING A P(A)-P(B)-P(A) STRUCTURE

(75) Inventors: Marc Husemann, Hamburg (DE); Stephan Zöllner, Hamburg (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 10/333,983

(22) PCT Filed: Jul. 27, 2001

(86) PCT No.: PCT/EP01/08739

§ 371 (c)(1),
(2), (4) Date: Dec. 10, 2004

(87) PCT Pub. No.: WO02/10309

PCT Pub. Date: Feb. 7, 2002

(65) Prior Publication Data

US 2005/0090592 A1    Apr. 28, 2005

(30) Foreign Application Priority Data

Jul. 28, 2000  (DE) ............................... 100 36 802

(51) Int. Cl.
*C08L 1/00* (2006.01)
(52) U.S. Cl. ...................... 524/322; 524/556
(58) Field of Classification Search ............... 524/556, 524/322; 525/94; 526/93, 145, 320; 428/208.4
See application file for complete search history.

(56) References Cited

U.S. PATENT DOCUMENTS

| 3,239,478 A | 3/1966 | Harlan, Jr. |
| 3,468,972 A | 9/1969 | Hsieh .................. 260/836 |
| 3,595,941 A | 7/1971 | Farrar et al. |
| 3,935,338 A | 1/1976 | Robertson .................. 427/207 |
| 4,861,635 A | 8/1989 | Carpenter et al. ............. 428/40 |
| 5,073,611 A | 12/1991 | Rehmer et al. .............. 526/208 |
| 5,274,036 A | 12/1993 | Korpman et al. ............. 525/92 |
| 5,314,962 A | 5/1994 | Otsu et al. .................. 525/280 |
| 5,403,658 A | 4/1995 | Southwick et al. ......... 428/355 |
| 5,741,543 A | 4/1998 | Winslow et al. ......... 427/208.4 |
| 5,763,548 A | 6/1998 | Matyjaszewski et al. ... 526/135 |
| 5,767,210 A | 6/1998 | Lecomte et al. ............ 526/166 |
| 5,789,487 A | 8/1998 | Matyjaszewski et al. ... 525/301 |
| 5,807,937 A | 9/1998 | Matyjaszewski et al. ... 526/135 |
| 5,811,500 A | 9/1998 | Dubois et al. .............. 526/145 |
| 5,854,346 A | 12/1998 | Meyer et al. .................. 525/64 |
| 5,945,491 A | 8/1999 | Matyjaszewski et al. ... 526/111 |
| 6,114,482 A | 9/2000 | Senninger et al. .......... 526/172 |
| 6,734,256 B1 * | 5/2004 | Everaerts et al. ........... 525/299 |
| 6,767,968 B1 * | 7/2004 | Liu et al. .................... 525/242 |

FOREIGN PATENT DOCUMENTS

| DE | 27 43 979 A1 | 4/1979 |
| DE | 38 83 162 T2 | 3/1994 |
| EP | 0349270 * | 6/1989 |
| EP | 0 660 187 A1 | 6/1995 |
| EP | 0 824 110 A1 | 2/1998 |
| EP | 0 826 698 A1 | 3/1998 |
| EP | 0 841 346 A1 | 5/1998 |
| EP | 0 850 957 A1 | 7/1998 |
| EP | 0 921 170 A1 | 6/1999 |
| EP | 0 451 920 B1 | 7/1999 |
| EP | 1 008 640 A1 | 6/2000 |
| GB | 2 267 284 A | 12/1993 |
| WO | WO 91/15365 | 10/1991 |
| WO | WO 93/17058 | 9/1993 |
| WO | WO 98/01478 | 1/1998 |

* cited by examiner

*Primary Examiner*—Robert D. Harlan
(74) *Attorney, Agent, or Firm*—Norris McLaughlin & Marcus PA

(57) ABSTRACT

A pressure sensitive adhesive comprised of P(A)-P(B)-P(A) block copolymers, wherein P(A) has a glass transition temperature of 0° C. or below, P(B) has a glass transition temperature of 20° C. or above, and P(A) and P(B) are immiscible.

18 Claims, No Drawings

ADHESIVE MATERIAL BASED ON BLOCK COPOLYMERS HAVING A P(A)-P(B)-P(A) STRUCTURE

This is a 371 of PCT/EP01/08739 filed 27 Jul. 2001 (international filing date).

The invention relates to pressure sensitive adhesives based on block copolymers of the general type P(A)-P(B)-P(A).

In the field of pressure sensitive adhesives (PSAs) continuing technological developments in the coating technique mean that there is an ongoing need for new developments. Within the industry, hotmelt processes with solventless coating technology are of increasing importance in the preparation of PSAs, since the environmental regulations are becoming ever more stringent and the prices of solvents continue to rise. Consequently, solvents are to be eliminated as far as possible from the manufacturing operation for PSA tapes. The associated introduction of the hotmelt technology is imposing ever-greater requirements on the adhesives. Acrylic PSAs in particular are the subject of very intensive investigations aimed at improvements. For high-level industrial applications, polyacrylates are preferred on account of their transparency and weathering stability. In addition to these advantages, however, these acrylic PSAs must also meet stringent requirements in respect of shear strength and bond strength. This profile of requirements is met by polyacrylates of high molecular weight and high polarity, and, subsequent to the preparation, of highly efficient crosslinking. These high shear strength, polar PSAs, however, possess the disadvantage that they are not well suited to the hotmelt extrusion operation, because high application temperatures are necessary and because, furthermore, shearing within the extruder lowers the molecular weight of the polymer. This damage significantly reduces the level of the adhesive properties. The bond strength and the tack are generally low, since owing to the polar fractions in the adhesives the glass transition temperature is relatively high. The shear strengths of the hotmelt-coated acrylic PSAs, in particular, fall distinctly in comparison to the original, solvent-coated PSA. At the present time, therefore, different concepts aimed at reducing the flow viscosity and thereby facilitating extrusion coating of these PSAs are being investigated. One possibility for this is the very efficient crosslinking of a low viscosity, apolar acrylic PSA not until it is on the backing, where appropriate by copolymerization of UV photoinitiators into the polyacrylate chain. For example, benzoin acrylate has been used as a comonomer and the crosslinking has been conducted on the backing using UV light [DE 27 43 979 A1]. In U.S. Pat. No. 5,073,611, on the other hand, benzophenone and acetophenone are used as copolymerizable monomers. Moreover, very efficient chemical crosslinking takes place by radiation in the case of polyacrylates containing double bonds [U.S. Pat. No. 5,741,543].

Styrene-isoprene-styrene (SIS) block copolymers, in contrast, are widespread elastomers for hotmelt-processable PSAs [preparation processes: U.S. Pat. Nos. 3,468,972; 3,595,941; application in PSAs: U.S. Pat. Nos. 3,239,478; 3,935,338]. Good processing properties are achieved by virtue of a relatively low molecular weight and by virtue of a specific morphology [EP 0 451 920 B1], which raises the shear strength. These PSAs can be crosslinked very effectively with UV light in the presence of photoinitiators (incorporated by copolymerization, where appropriate) or with electron beams, since the middle blocks contain a large number of double bonds. Nevertheless, these elastomers possess disadvantages, such as, for example, severe aging under UV light and in an atmosphere containing oxygen/ozone, and also a relatively low thermal shear strength, so that these PSAs are not suitable for relatively long-term outdoor bonds or for applications in relatively high temperature ranges.

An improvement in the problem of aging, hotmelt processability, high cohesion, and efficient chemical crosslinking by radiation is provided by the combination of SIS polymers with polyacrylates.

U.S. Pat. No. 5,314,962 describes A-B-A block copolymers as elastomers for adhesives, but these lead to an increase in cohesion of the PSA merely owing to A-domain formation and therefore lack great shear strength, especially at high temperatures.

EP 0 921 170 A1 describes A-B-A block copolymers which have been modified with additions of resin. Here, no crosslinking has been carried out, so that in this case as well the shear strength of the PSAs described is very low.

It is an object of the invention, therefore, to provide improved pressure sensitive adhesives based on polyacrylate which exhibit the disadvantages of the prior art only to a reduced extent, if at all, and with which it is possible to achieve an increase in the cohesion, and which, in particular, are suitable for processing by the hotmelt process and for use as hotmelt adhesives, without losing the properties which are advantageous for use as a PSA.

This object is achieved, surprisingly and unforeseeably, by the pressure sensitive adhesive as described in the main claim. The subclaims relate to improved developments of the pressure sensitive adhesive, and to their use.

Claim 1 relates accordingly to a pressure sensitive adhesive based on block copolymers of the general type P(A)-P(B)-P(A), each block copolymer being composed of one middle (co)polymer block P(B) and two end (co)polymer blocks P(A), characterized in that P(A) represents a (co)polymer block of a component A which is composed of at least one monomer A1, the (co)polymer block P(A) possessing a glass transition temperature of 0° C. or below, P(B) represents a (co)polymer block of at least one component B which is composed of at least one monomer B1, the (co)polymer block P(B) possessing a glass transition temperature of 20° C. or above, the (co)polymer block P(B) is insoluble in the (co)polymer block P(A), the blocks P(B) and P(A) are immiscible.

In one first advantageous embodiment of the inventive pressure sensitive adhesive, component A is composed of at least two monomers A1 and A2. In another outstanding embodiment, component A2 includes at least one functional group which behaves inertly in a free-radical polymerization reaction and which serves to raise the cohesion of the block copolymer; in particular, by bonds between the individual block copolymers, the functional group of component A2 of one block copolymer macromolecule entering into interaction with at least one further block copolymer macromolecule; in particular, by a crosslinking reaction.

This crosslinking is initiated advantageously by means of high-energy irradiation, examples being electron beams and UV light. It is also appropriate to supply thermal energy which induce crosslinking reaction, corresponding to the choice of the respective functional groups. The selection of the appropriate energy supply for a respective crosslinking reaction in the case of a given functional group is prior art and is known to the skilled worker.

Bonds between the individual block copolymers in the above sense are all bonds ranging from purely physical forces of attraction through to bonds originating from a chemical reaction (for example, covalent bonds, ionic bonds, van der Waals bonds).

Included here, in addition to the above-described crosslinking reactions, for example, are dipole-dipole interactions and/or hydrogen bonds.

It may be mentioned here that the function of forming bonds may also be served by interlinks, interloops, interhooks or the like between the macromolecules or side chains located thereon.

In one very favorable development of the inventive PSAs the block P(A) possesses a glass transition temperature of between $-80°$ C. and $0°$ C. and/or the block P(B) a glass transition temperature of between $25°$ C. and $180°$ C.

As monomers A1 it is possible to use acrylic monomers or vinyl monomers which, alone or in combination with monomer A2, lower the glass transition temperature to below $0°$ C.

In the inventive context it has proven very advantageous to use, as monomer A1, at least one compound of the following general formula

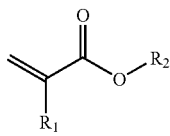

where $R_1$=H or $CH_3$ and $R_2$ is chosen from the group of the branched or unbranched, saturated alkyl groups having from 4 to 14 carbon atoms, very preferably having from 4 to 9 carbon atoms.

Specific examples of such (modified) acrylic and methacrylic esters are n-butyl acrylate, n-pentyl acrylate, n-hexyl acrylate, n-heptyl acrylate, n-octyl acrylate, n-nonyl acrylate, and branched isomers thereof, an example being 2-ethylhexyl acrylate.

Additionally it is favorable in the context of the invention to use, optionally, as monomers A1, vinyl monomers from the following groups:

vinyl esters, vinyl ethers, vinyl halides, vinylidene halides, vinyl compounds with aromatic rings and aliphatic rings in hetero-position.

Nonexclusive examples of these compounds are vinyl acetate, vinylformamide.

As monomer A2 it is advantageous to use acrylic monomers or vinyl monomers which, alone or in combination with monomer A1, lower the glass transition temperature of the block copolymer to below $0°$ C. and carry at least one functional group for crosslinking. In one advantageous variant of the process of the invention use is made, as monomer A2, of one or more compounds of the following general formula

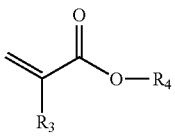

where $R_3$=H or $CH_3$ and the radical —$OR_4$ represents or contains the functional group for raising the cohesion of the pressure sensitive adhesive.

For the functional group it is advantageous to choose a hydroxyl, a carboxyl, an epoxy, an acid amide, an isocyanato or an amino group, a group containing a UV photoinitiator for UV crosslinking, or an unsaturated group.

Particularly preferred examples of component A2 are hydroxyethyl acrylate, hydroxypropyl acrylate, hydroxyethyl methacrylate, hydroxypropyl methacrylate, acrylic acid, methacrylic acid, allyl alcohol, maleic anhydride, itaconic anhydride, itaconic acid, benzoin acrylate, acrylated benzophenone, acrylamide, dimethylacrylamide, and glyceridyl methacrylate, this list not being conclusive.

In addition to acrylic monomers it is also possible to use vinyl compounds having double bonds which do not react during the polymerization. Particularly preferred examples thereof are isoprene and butadiene. For acrylates modified with double bonds, allyl acrylate and acrylated cinnamic esters are especially advantageous. Further very advantageous methods of introducing unsaturated compounds are described in U.S. Pat. No. 5,741,543.

As monomer B1 use ought to be made of at least one monomer such that the resulting (co)polymer blocks P(B) are capable of forming a 2-phase domain structure with the (co)polymer blocks P(A). Examples hereof are vinylaromatics, methyl methacrylates, cyclohexyl methacrylates, isobornyl methacrylates; especially methyl methacrylate and styrene.

In one preferred embodiment of the inventive block copolymers the pressure sensitive adhesive possesses an average molecular weight of between 25,000 and 750,000 g/mol, in particular between 100,000 and 500,000 g/mol.

It is further of advantage if the fraction of the polymer blocks P(B) lies between 10 and 60 percent by weight of the entire block copolymer, more preferably between 15 and 40 percent by weight.

The weight fraction of component A2 in relation to component A1 lies preferably between 0.1 and 20, in particular between 0.5 and 5.

For preparing the block copolymers of the invention it is possible to make use of any controlled-growth polymerizations which proceed in accordance with free-radical mechanisms. Also suitable are the polymerization reactions which proceed in accordance with anionic mechanisms, particularly for those block copolymers of the invention where there is no crosslinking-capable group or where this group is inert toward reactions in which ions are involved or in which ions are formed during the course of the reaction.

Examples of advantageous preparation processes are ATRP (atom-transfer radical polymerization), polymerization controlled by nitroxide or TEMPO (2,2,6,6-tetramethyl-1-piperidinyloxy pyrrolidinyloxy) and/or its derivatives, or polymerization by the RAFT process (rapid addition-fragmentation chain transfer). For the preparation it is possible, for example, to use a difunctional initiator which in one step initiates the polymerization of the component B and then in a second step polymerizes components A (or A1 and A2), as end blocks (II), it being possible as an option to isolate the intermediate. I-R-I in the reaction equation which follows represents the difunctional initiator containing the functional groups I.

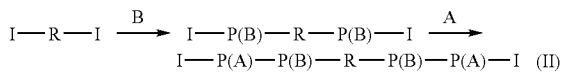

In addition, the triblock copolymer may be prepared by free-radical recombination of the macromonomers P(A)-P(B)* (III).

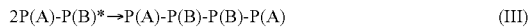

For polymerizing the block copolymers it is possible with preference to use nitroxide regulators for free-radical control. The polymerization may be conducted in the presence of one or more organic solvents and/or in the presence of water or without solvent. It is preferred to use as little solvent as possible. The polymerization time, depending on conversion rate and temperature, is between 6 and 48 h.

In the case of solution polymerization, preferred solvents used are esters of saturated carboxylic acids (such as ethyl acetate), aliphatic hydrocarbons (such as n-hexane or n-heptane), ketones (such as acetone or methyl ethyl ketone), special boiling point spirit or mixtures of these solvents. For polymerization in aqueous media or in mixtures of organic and aqueous solvents, it is preferred to add emulsifiers and stabilizers known to those skilled in the art for the polymerization. Polymerization initiators used include customary radical-forming compounds such as, for example, peroxides, azo compounds, and peroxosulfates. Mixtures of initiators can also be used. For free-radical stabilization use is made of nitroxides of type (IVa) or (IVb)

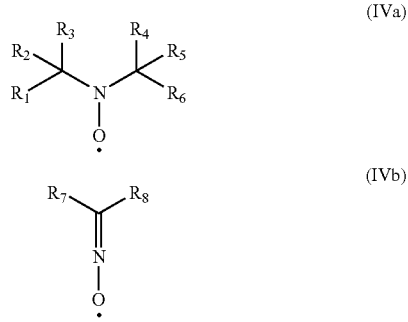

where $R_1$, $R_2$, $R_3$, $R_4$, $R_5$, $R_6$, $R_7$ and $R_8$ represent identical or different compounds or atoms:
  one or more halides, such as chlorine, bromine or iodine, for example
  the group of the linear, branched cyclic, saturated or unsaturated hydrocarbons represent
  from the group of the esters —COOR$_9$ or alkoxides —OR$_{10}$ or phosphonates —PO(OR$_{11}$)$_2$, where $R_9$, $R_{10}$ or $R_{11}$ representatively stand for groups of the linear, branched cyclic, saturated or unsaturated hydrocarbons.

The compounds (IVa) or (IVb) may also be attached to polymer chains of any kind and may therefore be utilized for synthesizing the block copolymers, as macroradicals or macroregulators.

More preferred are controlled regulators for the polymerization of compounds of the following type:

2,2,5,5-tetramethyl-1-pyrrolidinyloxyl (generally known and commercially available as PROXYL), 3-carbamoyl-PROXYL, 2,2-dimethyl 4,5-cyclohexyl-PROXYL, 3-oxo-PROXYL, 3-hydroxylimine-PROXYL, 3-aminomethyl-PROXYL, 3-methoxy-PROXYL, 3-t-butyl-PROXYL, 3,4-di-t-butyl-PROXYL 2,2,6,6-tetramethyl-1-piperidinyloxy pyrrolidinyloxyl (generally known and commercially available as TEMPO), 4-benzoyloxy-TEMPO, 4-methoxy-TEMPO, 4-chloro-TEMPO, 4-hydroxy-TEMPO, 4-oxo-TEMPO, 4-amino-TEMPO, 2,2,6,6-tetraethyl-1-piperidinyloxyl, 2,2,6-trimethyl-6-ethyl-1-piperidinyloxyl N-tert-butyl-1-phenyl-2-methyl propyl nitroxide N-tert-butyl-1-(2-naphthyl)-2-methyl propyl nitroxide, N-tert-butyl-1-diethylphosphono-2,2-dimethyl propyl nitroxide N-tert-butyl-1-dibenzylphosphono-2,2-dimethyl propyl nitroxide N-(1-phenyl-2-methylpropyl)-1-diethylphosphono-1-methyl ethyl nitroxide di-t-butyl nitroxide diphenyl nitroxide T-butyl t-amyl nitroxide As a further controlled polymerization method use is made of atom transfer radical polymerization ATRP, in which case as initiator it is preferred to use monofunctional or difunctional secondary or tertiary halides and, for the obstruction of the halide(s), complexes of Cu, of Ni, of Fe, of Pd, of Pt, of Ru, of Os, of Rh, of Co, of Ir, of Cu, of Ag or of Au [EP 0 824 111; EP 0 826 698; EP 0 824 110; EP 0 841 346; EP 0 850 957]. The various possibilities of ATRP are furthermore described in patents U.S. Pat. Nos. 5,945,491, 5,854,364 and 5,789,487.

As a further preferred variant, the RAFT process (reversible addition fragmentation chain transfer) is carried out. The process is described in detail in patents WO 98/01478 and WO 99/31144. Suitable with particular advantage for preparing block copolymers are trithiocarbonates [Macromolecules 2000, 33, 243-245], which in a first step randomly copolymerize monomers of the middle block, subsequently can be isolated or can be used directly for the subsequent copolymerization of monomers of the end blocks.

In order to prepare a pressure sensitive adhesive the block copolymers described so far are processed furthers in solution or from the melt. Suitable solvents are one or more organic solvents. In order to produce a pressure sensitive adhesive tape the block copolymer must be modified with resins. Examples of resins which can be used include terpene resins, terpene phenol resins, $C_5$ and $C_9$ hydrocarbon resins, pinene resins, indene resins, and rosins, alone and also in combination with one another. In principle, however, it is possible to use all resins which are soluble in the corresponding polyacrylate; reference may be made in particular to all aliphatic, aromatic, alkylaromatic hydrocarbon resins, hydrocarbon resins based on pure monomers, hydrogenated hydrocarbon resins, functional hydrocarbon resins, and also natural resins.

The weight fraction of the resins within the block copolymer may be between 0 and 50% by weight, more preferably between 20 and 40% by weight.

It is additionally possible to add plasticizers, various fillers (for example, carbon black, $TiO_2$, solid or hollow beads of glass or other materials, nucleators), blowing agents, compounding agents and/or aging inhibitors.

In an advantageous development, crosslinker substances compatible/soluble in P(A) are added. Examples of suitable crosslinkers include polyfunctional acrylates, polyfunctional hydroxides, polyfunctional expoxides, polyfunctional amines or polyfunctional isocyanates. This list does not make any claim to completeness.

In one advantageous development, UV photoinitiators are added to the block copolymers, especially to those with groups capable of crosslinking and, in this context, especially those having groups capable of crosslinking by initiation through UV light. Suitable and advantageous photoinitiators are, for example, benzoin ethers, such as benzoin methyl ether and benzoin isopropyl ether, for example, substituted acetophenones, such as 2,2-diethoxyacetophenone (available as Irgacure 651 from Ciba Geigy), 2,2-dimethoxy-2-phenyl-1-phenylethanone, dimethoxyhydroxyacetophenone, substituted alpha-ketols, such as 2-methoxy-2-hydroxypropiophenone, for example, aromatic sulfonyl chlorides, such as 2-naphthylsulfonyl chloride, for example, and photoactive oximes, such as 1-phenyl-1,2-propanedione 2-(o-ethoxycarbonyl) oxime.

A feature of one further development, which makes the process of the invention particularly advantageous for the production of adhesive tapes, for example, is that the pressure sensitive adhesive is processed further from the melt, and that it is applied in particular to a backing.

As backing material, for adhesive tapes for example, it is possible in this context to use the materials which are customary and familiar to the skilled worker, such as films (polyesters, PET, PE, PP, BOPP, PVC), nonwovens, foams, wovens, and woven films, and also release paper (glassine, HDPE, LDPE). This list should not be conclusive.

The crosslinking of the hotmelt pressure sensitive adhesives of the invention is accomplished by brief UV irradiation in the range of 200-400 nm using standard commercial high-pressure or medium-pressure mercury lamps with an output, for example, of from 80 to 200 W/cm or ionizing radiation, such as electron beam curing, for example. For UV crosslinking it may be appropriate to adapt the lamp output to the web speed or to carry out partial shading of the web, while running it slowly, in order to reduce the thermal stress to which it is subjected. The irradiation time is governed by the construction and output of the respective lamps.

Crosslinking may also be initiated or promoted by thermal energy, particularly at a temperature of 70-140° C.

For testing, depending on the sample, PET films or siliconized release papers are coated with an application rate of 50 g/m².

The invention further relates to the pressure sensitive adhesive obtained by the process of the invention or by one of its developments.

The content of the invention is furthermore the use of the pressure sensitive adhesive thus obtained for an adhesive tape, in which case the acrylic pressure sensitive adhesive is present as a single-side or both-sides film on a backing.

The intention is to illustrate the invention below by a number of examples, without thereby wishing to subject it to any unnecessary restriction.

As a function of the desired technical adhesive properties of the acrylic hotmelts, a selection of acrylic and vinylic monomers is made. Quantities, proportions, and percentage fractions are based on the total amount of the monomers.

EXAMPLES

Test Methods

The following test methods were employed for evaluating the technical adhesive properties of the PSAs prepared.

Shear Strength (Test A1, A2)

A strip of the adhesive tape, 13 mm wide, was applied to a smooth, cleaned steel surface. The application area was 20 mm×13 mm (length×width). The following procedure was then undertaken:

Test A1: At room temperature, a 1 kg weight was fastened to the adhesive tape and the time recorded until the weight fell off.

Test A2: At 70° C., a 1 kg weight was fastened to the adhesive tape and the time recorded until the weight fell off.

The shear stability times measured are each reported in minutes and correspond to the average of three measurements.

180° Bond Strength Test (Test B)

A strip, 20 mm wide, of an acrylate pressure adhesive applied as a film to polyester was applied to steel plates. The PSA strip was pressed onto the substrate twice using a 2 kg weight. The adhesive tape was then immediately peeled from the substrate at 300 mm/min and at an angle of 180°. The steel plates were washed twice with acetone and once with isopropanol. All measurements were conducted at room temperature under climate-controlled conditions.

The results of the measurements are reported in N/cm and are averaged from three measurements.

Determination of the Gel Fraction (Test C)

After careful drying, the solvent-free samples of adhesive are welded into a pouch of polyethylene nonwoven (Tyvek web). The difference in the weight of the samples before extraction and after extraction with toluene is used to determine the gel index as a percentage of the toluene-insoluble weight fraction of the polymer.

Preparation of the Samples

The acrylates, methacrylates, and styrene used are available commercially and were purified by distillation before being used. Trithiocarbonate (V) as a regulator was prepared in accordance with Macromolecules 2000, 33, 243-245 and Synth. Commun. 1988, 18, 1531-1536.

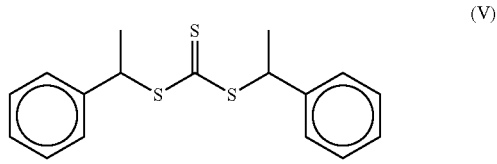

(V)

Procedure for the Polymerizations

The polymerization was generally conducted in two stages. In the first step the polyacrylate blocks were prepared, in the second step the polystyrene and/or polymethyl methacrylate blocks.

Example 1

A 2,000 ml Schlenk vessel was charged with 800 g of n-butyl acrylate, 400 ml of toluene, 0.156 g of the trithiocarbonate (V) and 0.12 g of azoisobutyronitrile (AIBN), the vessel was degassed three times and then the polymerization was conducted under argon. For initiation the reaction mixture was heated to 60° C. and polymerized for 8 h with stirring. Then, under reduced pressure, the solvent and the remaining monomers were separated off by distillation and 250 ml of toluene and also 160 g of styrene were added. After a further reaction time of 24 h at 90° C., for isolation, the reaction mixture was cooled to RT and the polymer was dissolved in 800 ml of dichloromethane and then precipitated from 8.0 L of methanol (cooled to −78° C.) with vigorous stirring. The precipitate was filtered off on a cooled frit and then analyzed via GPC ($M_n$=412,000 g/mol, $M_{w/n}$=1.67).

100 g of the block copolymer were dissolved in 200 g of toluene and then 30 weight fractions of Foral 85™ (Hercules) and 5 weight fractions of Catenex 945™ (Shell) were added. The compounded composition was spread from solution at 50 g/m² onto a siliconized release paper and then dried at 120° C. for 15 minutes. To analyze the technical adhesive properties, test methods A1, A2, B and C were carried out.

Example 2

A 2,000 ml Schlenk vessel was charged with 800 g of 2-ethylhexyl acrylate, 400 ml of toluene, 0.156 g of the trithiocarbonate (V) and 0.12 g of azoisobutyronitrile (AIBN), the vessel was degassed three times and then the polymerization was conducted under argon. For initiation the reaction mixture was heated to 60° C. and polymerized for 8 h with stirring. Then, under reduced pressure, the solvent and the remaining monomers were separated off by distillation and 250 ml of toluene and also 160 g of styrene were added. After a further reaction time of 24 h at 90° C., for isolation, the reaction mixture was cooled to RT and the polymer was dissolved in 800 ml of dichloromethane and then precipitated from 8.0 L of methanol (cooled to −78° C.) with vigorous stirring. The precipitate was filtered off on a cooled frit and then analyzed via GPC ($M_n$=401,000 g/mol, $M_{w/n}$=1.70).

100 g of the block copolymer were dissolved in 200 g of toluene and then 20 weight fractions of Foral 85™ (Hercules) and 3 weight fractions of Catenex 945™ (Shell) were added. The compounded composition was freed from the solvent and then coated from the melt through a slot die at 50 g/m² onto a siliconized release paper and then irradiated with an electron beam dose (EB dose) of 60 kGy with an acceleration voltage of 230 kV. To analyze the technical adhesive properties, test methods A1, A2, B and C were carried out.

Example 3

A 2,000 ml Schlenk vessel was charged with 650 g of 2-ethylhexyl acrylate, 150 g of N-tert-butylacrylamide, 400 ml of toluene, 0.156 g of the trithiocarbonate (V) and 0.12 g of azoisobutyronitrile (AIBN), the vessel was degassed three times and then the polymerization was conducted under argon. For initiation the reaction mixture was heated to 60° C. and polymerized for 8 h with stirring. Then, under reduced pressure, the solvent and the remaining monomers were separated off by distillation and 250 ml of toluene and also 160 g of styrene were added. After a further reaction time of 24 h at 90° C., for isolation, the reaction mixture was cooled to RT and the polymer was dissolved in 800 ml of dichloromethane and then precipitated from 8.0 L of methanol (cooled to −78° C.) with vigorous stirring. The precipitate was filtered off on a cooled frit and then analyzed via GPC ($M_n$=384,000 g/mol, $M_{w/n}$=1.73).

100 g of the block copolymer were dissolved in 200 g of toluene and then 20 weight fractions of Foral 85™ (Hercules) and 3 weight fractions of Catenex 945™ (Shell) were added. The compounded composition was freed from the solvent and then coated from the melt through a slot die at 50 g/m² onto a siliconized release paper and then irradiated with a EB dose of 60 kGy with an acceleration voltage of 230 kV. To analyze the technical adhesive properties, test methods A1, A2, B and C were carried out.

Example 4

A 2,000 ml Schlenk vessel was charged with 400 g of 2-ethylhexyl acrylate, 400 g of n-butyl acrylate, 400 ml of toluene, 0.156 g of the trithiocarbonate (V) and 0.12 g of azoisobutyronitrile (AIBN), the vessel was degassed three times and then the polymerization was conducted under argon. For initiation the reaction mixture was heated to 60° C. and polymerized for 8 h with stirring. The reaction mixture was then cooled to room temperature and the polymer was precipitated from 6.0 L of methanol (cooled to −78° C.) with vigorous stirring. After isolation through a cooled frit and drying under reduced pressure, 400 g of the polymer were again introduced into a 2,000 ml Schlenk vessel, 500 ml of toluene, 0.25 g of 1,1'-azobis(1-cyclohexanecarbonitrile) (Vazo 88™, DuPont), 150 g of methyl methacrylate were added, the vessel was degassed three times and then the polymerization was carried out under argon at 80° C. with a reaction time of 8 h, with stirring. For isolation, the reaction mixture was cooled to RT, the polymer was dissolved in 700 ml of dichloromethane and then precipitated from 8.0 L of methanol (cooled to −78° C.) with vigorous stirring. The precipitate was filtered off on a cooled frit and then analyzed via GPC ($M_n$=445,000 g/mol, $M_{w/n}$=1.61).

100 g of the block copolymer were dissolved in 200 g of toluene and then 20 weight fractions of Foral 85™ (Hercules) and 3 weight fractions of Catenex 945™ (Shell) were added. The compounded composition was freed from the solvent and then coated from the melt through a slot die at 50 g/m² onto a siliconized release paper and then irradiated with a EB dose of 60 kGy with an acceleration voltage of 230 kV. To analyze the technical adhesive properties, test methods A1, A2, B and C were carried out.

Example 5

A 2,000 ml Schlenk vessel was charged with 760 g of n-butyl acrylate, 40 g of acrylic acid, 400 ml of toluene, 0.156 g of the trithiocarbonate (V) and 0.12 g of azoisobutyronitrile (AIBN), the vessel was degassed three times and then the polymerization was conducted under argon. For initiation the reaction mixture was heated to 60° C. and polymerized for 8 h with stirring. Then, under reduced pressure, the solvent and the remaining monomers were separated off by distillation and 250 ml of toluene and also 160 g of styrene were added. After a further reaction time of 24 h at 90° C., for isolation, the reaction mixture was cooled to RT and the polymer was dissolved in 800 ml of dichloromethane and then precipitated from 8.0 L of methanol (cooled to −78° C.) with vigorous stirring. The precipitate was filtered off on a cooled frit and then analyzed via GPC ($M_n$=430,000 g/mol, $M_{w/n}$=1.76).

100 g of the block copolymer were dissolved in 200 g of toluene and then 20 weight fractions of Foral 85™ (Hercules) and 3 weight fractions of Catenex 945™ (Shell) and 0.6 weight fractions of aluminum acetylacetonate were added. The compounded composition was spread from solution at 50 g/m² onto a siliconized release paper and then dried at 120° C. for 20 minutes. To analyze the technical adhesive properties, test methods A1, A2 and B were carried out.

Example 6

A 2,000 ml Schlenk vessel was charged with 780 g of 2-ethylhexyl acrylate, 20 g of hydroxyethyl acrylate, 400 ml of toluene, 0.156 g of the trithiocarbonate (V) and 0.12 g of azoisobutyronitrile (AIBN), the vessel was degassed three times and then the polymerization was conducted under argon. For initiation the reaction mixture was heated to 60° C. and polymerized for 8 h with stirring. Then, under reduced pressure, the solvent and the remaining monomers were separated off by distillation and 250 ml of toluene and also 160 g of styrene were added. After a further reaction time of 24 h at 90° C., for isolation, the reaction mixture was cooled to RT and the polymer was dissolved in 800 ml of dichloromethane and then precipitated from 8.0 L of methanol (cooled to −78° C.) with vigorous stirring. The precipitate was filtered off on a cooled frit and then analyzed via GPC ($M_n$=405,000 g/mol, $M_{w/n}$=1.71).

100 g of the block copolymer were dissolved in 200 g of toluene and then 20 weight fractions of Foral 85™ (Hercules) and 3 weight fractions of Catenex 945™ (Shell) and 0.6 weight fractions of Desmodur N75™ (Bayer) were added. The compounded composition was spread from solution at 50 g/m² onto a siliconized release paper and then dried at 120° C. for 20 minutes. To analyze the technical adhesive properties, test methods A1, A2 and B were carried out.

Example 7

A 2,000 ml Schlenk vessel was charged with 796 g of 2-ethylhexyl acrylate, 4 g of acrylated benzophenone Ebecryl 36™ (UCB), 400 ml of toluene, 0.156 g of the trithiocarbonate (V) and 0.12 g of azoisobutyronitrile (AIBN), the vessel was degassed three times and then the polymerization was conducted under argon. For initiation the reaction mixture was heated to 60° C. and polymerized for 8 h with stirring. Then, under reduced pressure, the solvent and the remaining monomers were separated off by distillation and 250 ml of toluene and also 160 g of styrene were added. After a further reaction time of 24 h at 90° C., for isolation, the reaction mixture was cooled to RT and the polymer was dissolved in 800 ml of dichloromethane and then precipitated from 8.0 L of methanol (cooled to −78° C.) with vigorous stirring. The precipitate was filtered off on a cooled frit and then analyzed via GPC ($M_n$=422,000 g/mol, $M_{w/n}$=1.65).

100 g of the block copolymer were dissolved in 200 g of toluene and then 20 weight fractions of RX-207™ (Cray Valley) and 3 weight fractions of Catenex 945™ (Shell) were added. The compounded composition was spread from solution at 50 g/m² onto a siliconized release paper and then dried at 120° C. for 15 minutes. For curing, these samples were irradiated at 20 m/min using a medium-pressure mercury lamp (120 W/cm) with 4 passes through the lamp. As a reference, the unirradiated PSA tape was likewise tested (example 7'). To analyze the technical adhesive properties, test methods A1, A2, B and C were carried out.

Example 8

A 2,000 ml Schlenk vessel was charged with 770 g of 2-ethylhexyl acrylate, 20 g of N-tert-butylacrylamide, 4 g of benzoin acrylate, 400 ml of toluene, 0.156 g of the trithiocarbonate (V) and 0.12 g of azoisobutyronitrile (AIBN), the vessel was degassed three times and then the polymerization was conducted under argon. For initiation the reaction mixture was heated to 60° C. and polymerized for 8 h with stirring. Then, under reduced pressure, the solvent and the remaining monomers were separated off by distillation and 250 ml of toluene and also 160 g of styrene were added. After a further reaction time of 24 h at 90° C., for isolation, the reaction mixture was cooled to RT and the polymer was dissolved in 800 ml of dichloromethane and then precipitated from 8.0 L of methanol (cooled to −78° C.) with vigorous stirring. The precipitate was filtered off on a cooled frit and then analyzed via GPC ($M_n$=397,000 g/mol, $M_{w/n}$=1.73).

100 g of the block copolymer were dissolved in 200 g of toluene and then 20 weight fractions of RX-207™ (Cray Valley) and 3 weight fractions of Catenex 945™ (Shell) were added. The compounded composition was spread from solution at 50 g/m² onto a siliconized release paper and then dried at 120° C. for 15 minutes. For curing, these samples were irradiated at 20 m/min using a medium-pressure mercury lamp (120 W/cm) with 4 passes through the lamp. As a reference, the unirradiated PSA tape was likewise tested (example 8'). To analyze the technical adhesive properties, test methods A1, A2, B and C were carried out.

Example 9

A 2,000 ml Schlenk vessel was charged with 750 g of 2-ethylhexyl acrylate, 40 g of methyl acrylate, 10 g of acrylated cinnamic ester, 400 ml of toluene, 0.156 g of the trithiocarbonate (V) and 0.12 g of azoisobutyronitrile (AIBN), the vessel was degassed three times and then the polymerization was conducted under argon. For initiation the reaction mixture was heated to 60° C. and polymerized for 8 h with stirring. Then, under reduced pressure, the solvent and the remaining monomers were separated off by distillation and 250 ml of toluene and also 160 g of styrene were added. After a further reaction time of 24 h at 90° C., for isolation, the reaction mixture was cooled to RT and the polymer was dissolved in 800 ml of dichloromethane and then precipitated from 8.0 L of methanol (cooled to −78° C.) with vigorous stirring. The precipitate was filtered off on a cooled frit and then analyzed via GPC ($M_n$=402,000 g/mol, $M_{w/n}$=1.78).

100 g of the block copolymer were dissolved in 200 g of toluene and then 20 weight fractions of RX-207™ (Cray Valley) and 3 weight fractions of Catenex 945™ (Shell) were added. The compounded composition was concentrated and then coated from the melt through a slot die onto a siliconized release paper. For curing, the adhesive tape sample was irradiated with an EB dose of 20 kGy with an acceleration voltage of 230 kV. To analyze the technical adhesive properties, test methods A1, A2, B and C were carried out.

Example 10

A 2,000 ml Schlenk vessel was charged with 750 g of 2-ethylhexyl acrylate, 40 g of methyl acrylate, 10 g of acrylated cinnamic ester, 400 ml of toluene, 0.156 g of the trithiocarbonate (V) and 0.12 g of azoisobutyronitrile (AIBN), the vessel was degassed three times and then the polymerization was conducted under argon. For initiation the reaction mixture was heated to 60° C. and polymerized for 8 h with stirring. Then, under reduced pressure, the solvent and the remaining monomers were separated off by distillation and 250 ml of toluene and also 240 g of styrene were added. After a further reaction time of 24 h at 90° C., for isolation, the reaction mixture was cooled to RT and the polymer was dissolved in 800 ml of dichloromethane and then precipitated from 8.0 L of methanol (cooled to −78° C.) with vigorous stirring. The precipitate was filtered off on a cooled frit and then analyzed via GPC ($M_n$=455,000 g/mol, $M_{w/n}$=1.89).

100 g of the block copolymer were dissolved in 200 g of toluene and then 20 weight fractions of RX-207™ (Cray Valley) and 3 weight fractions of Catenex 945™ (Shell) were added. The compounded composition was concentrated and then coated from the melt through a slot die onto a siliconized release paper. For curing, the adhesive tape sample was irradiated with an EB dose of 20 kGy with an acceleration voltage of 230 kV. To analyze the technical adhesive properties, test methods A1, A2, B and C were carried out.

Results

The table below lists the technical adhesive properties of examples 1 to 4.

TABLE 1

| Example | SST RT Test A1 | SST 70° C. Test A2 | BS-steel [N/cm] Test B | Gel index [%] Test C |
| --- | --- | --- | --- | --- |
| 1 | 390 | 2 | 13.5 | 0 |
| 2 | +10000 | 1020 | 5.1 | 34 |
| 3 | +10000 | 4635 | 4.6 | 40 |
| 4 | +10000 | 2270 | 5.0 | 32 |

Application rate: 50 g/m².
SST: Shear stability times [min]
RT: Room temperature
BS: Bond strength on steel Example 1 shows that with the use of the block copolymer of the invention it is possible to produce pressure sensitive adhesives of very high bond strength. Through electron beam crosslinking it is possible to achieve a marked increase in the shear strength—especially under hot conditions. Example 3 demonstrates that the thermal shear strength can be increased further by raising the glass transition temperature, by means of N-tert-butylacrylamide in the end blocks. With a PMMA middle block, as well, good cohesion is achieved (example 4).

Table 2 shows the results of the technical adhesive evaluations of examples 5 to 10.

TABLE 2

| Example | SST RT Test A1 | SST 70° C. Test A2 | BS-steel [N/cm] Test B | Gel index [%] Test C |
| --- | --- | --- | --- | --- |
| 5 | +10000 | 2350 | 5.8 | — |
| 6 | +10000 | 1755 | 5.7 | — |
| 7 | +10000 | 1090 | 6.4 | 49 |
| 7' | 765 | 15 | 12.7 | 0 |
| 8 | +10000 | 4550 | 6.0 | 54 |
| 8' | 465 | 5 | 12.2 | 0 |
| 9 | +10000 | 1105 | 5.7 | 52 |
| 10 | +10000 | 3005 | 5.4 | 55 |

Application rate: 50 g/m².
SST: Shear stability times [min]
RT: Room temperature
BS: Bond strength on steel Application rate: 50 g/m².
SST: Shear stability times [min]
RT: Room temperature
BS: Bond strength on steel Examples 5 and 6 demonstrate that both acrylic acid and hydroxyethyl acrylate are suitable for inserting into the block copolymer functional groups which can be utilized for thermal crosslinking with metal chelates or polyfunctionalized isocyanates, respectively, and which therefore make possible PSAs of high shear strength. Examples 7 and 8 show that, in addition, photoinitiators can be copolymerized and after UV irradiation lead to gel formation. The comparison with the unirradiated specimens (examples 7' and 8') provides significantly higher figures for the irradiated specimens, both in terms of shear strength at room temperature and in terms of the thermal shear strength, which correlates in turn with a marked increase in cohesion.

Examples 9 and 10 demonstrate that through the incorporation of double bonds electron beam crosslinkability is facilitated and thus it is possible to crosslink acrylic block copolymers efficiently.

The invention claimed is:

1. A pressure sensitive adhesive comprised of P(A)-P(B)-P(A) block copolymers, each block copolymer having one middle (co)polymer block P(B) and two end (co)polymer blocks P(A), wherein
P(A) represents a (co)polymer block of a component A which is comprised of at least one monomer A1 of the formula

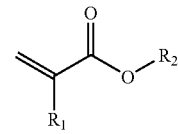

where $R_1$=H or $CH_3$ and $R_2$ is selected from the group consisting of branched or unbranched, saturated alkyl groups having 4 to 14 carbon atoms, the (co)polymer block P(A) having a glass transition temperature of 0° C. or below,
P(B) represents a (co)polymer block of a component B which is comprised on at least one monomer B1, the (co)polymer block P(B) having a glass transition temperature of 20° C. or above,
the (co)polymer block P(B) is insoluble in the (co)polymer block P(A) and the (co)polymer blocks P(A) and P(B) are immiscible
said block copolymer being formed by a Rapid Addition-Fragmentation Transfer (RAFT) mechanism said pressure sensitive adhesive compound further comprising resins which are soluble in polyacrylates, and
said pressure sensitive adhesive compound comprising no metal ions.

2. The pressure sensitive adhesive of claim 1, wherein component A is composed of at least two monomers A1 and A2.

3. The pressure sensitive adhesive of claim 2, wherein the monomer A2 has at least one functional group which behaves inertly in a free-radical polymerization reaction and which serves to raise the cohesion of the block copolymer by bonds between the individual block copolymers, the functional group of at least one copolymerized monomer A2 of one block copolymer macromolecule entering into interaction with at least one further block copolymer macromolecule.

4. The pressure sensitive adhesive as claimed in claim 1, wherein the (co)polymer P(A) has a glass transition temperature of between −80° C. and 0° C., or the (co)polymer block P(B) has a glass transition temperature of between 25° C. and 180° C., or both.

5. The pressure sensitive adhesive of claim 3, wherein component A comprises at least one monomer A2 of the following formula

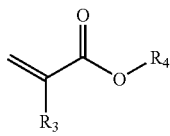

where $R_3$=H or $CH_3$ and —$OR_4$ represents or contains the functional group for increasing the cohesion.

6. The pressure sensitive adhesive of claim 3, wherein the cohesion-increasing functional group is selected from the group consisting of hydroxyl, carboxyl, epoxy, acid amide, isocyanato amino, a group containing a photoinitiator for UV crosslinking, and an unsaturated group.

7. The pressure sensitive adhesive of claim 1, wherein component B comprises at least one monomer B1 which results in (co)polymer blocks P(B) which are capable of forming a two-phase domain structure with the (co)polymer blocks P(A).

8. The pressure sensitive adhesive of claim 1, having an average molecular weight of between 25,000 and 750,000 g/mol.

9. The pressure sensitive adhesive of claim 1, wherein (co)polymer blocks P(B) represent between 10 and 60% by weight of the entire block copolymer.

10. The pressure sensitive adhesive of claim 2, wherein the weight ration of A2 to A1 is between 0.1 and 20.

11. The pressure sensitive adhesive of claim 1, further comprising up to 50% by weight of additives selected from the group consisting of resins, crosslinkers, aging inhibitors, light stabilizers, ozone protectants, fatty acids, plasticizers, nucleators, blowing agents, accelerators, fillers, and combinations thereof.

12. An adhesive tape provided with the pressure sensitive adhesive of claim 1 on one or both sides.

13. The pressure sensitive adhesive of claim 3, wherein said interaction is a cross-linking reaction.

14. The pressure sensitive adhesive of claim 8, wherein said average molecular weight is between 100,000 and 500,000 g/mol.

15. The pressure sensitive adhesive of claim 9, wherein said (co)polymer blocks P(B) represents between 15 and 40% by weight of the entire block.

16. The pressure sensitive adhesive of claim 10, wherein said weight ratio is between 0.5 and 10.

17. The pressure sensitive adhesive of claim 11, wherein said amount is from 20 to 40% by weight.

18. The adhesive tape of claim 12, wherein said adhesive tape is formed by applying said pressure sensitive adhesive as a melt to one or both sides of a backing.

* * * * *